United States Patent
Chang et al.

(10) Patent No.: US 10,511,204 B2
(45) Date of Patent: Dec. 17, 2019

(54) COOLING FAN STRUCTURE WITH ROTATIONAL CYLINDRICAL FAN BLADES

(71) Applicant: ASIA VITAL COMPONENTS CO., LTD., New Taipei (TW)

(72) Inventors: Bor-Haw Chang, New Taipei (TW); Chung-Shu Wang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 303 days.

(21) Appl. No.: 15/683,744

(22) Filed: Aug. 22, 2017

(65) Prior Publication Data

US 2019/0063454 A1 Feb. 28, 2019

(51) Int. Cl.

| | |
|---|---|
| F04D 5/00 | (2006.01) |
| H02K 5/16 | (2006.01) |
| F04D 25/06 | (2006.01) |
| F04D 29/30 | (2006.01) |
| F04D 29/66 | (2006.01) |
| F04D 23/00 | (2006.01) |
| F04D 29/38 | (2006.01) |
| H02K 21/22 | (2006.01) |
| H02K 7/14 | (2006.01) |
| F04D 29/32 | (2006.01) |
| F04D 17/16 | (2006.01) |
| F04D 19/00 | (2006.01) |
| F04D 29/28 | (2006.01) |

(52) U.S. Cl.
CPC ................. *H02K 5/16* (2013.01); *F04D 5/00* (2013.01); *F04D 5/001* (2013.01); *F04D 23/00* (2013.01); *F04D 25/06* (2013.01); *F04D 25/0613* (2013.01); *F04D 29/30* (2013.01); *F04D 29/38* (2013.01); *F04D 29/663* (2013.01); *H02K 7/14* (2013.01); *H02K 21/22* (2013.01); *F04D 17/16* (2013.01); *F04D 19/002* (2013.01); *F04D 29/281* (2013.01); *F04D 29/329* (2013.01)

(58) Field of Classification Search
CPC ........ F04D 5/00; F04D 5/001; F04D 25/0613; F04D 29/384
USPC .................................................. 415/90; 416/4
See application file for complete search history.

(56) References Cited

U.S. PATENT DOCUMENTS

| | | | | |
|---|---|---|---|---|
| 2,433,795 | A * | 12/1947 | Stokes .................. | F04D 17/167 416/91 |
| 4,795,319 | A * | 1/1989 | Popovich ............... | A45D 20/12 415/119 |
| 5,297,942 | A * | 3/1994 | Fleishman ............. | A45D 20/12 34/97 |
| 8,582,296 | B2 * | 11/2013 | Huang .................... | G06F 1/203 174/16.1 |

(Continued)

*Primary Examiner* — Patrick Hamo
(74) *Attorney, Agent, or Firm* — Jackson IPG PLLC; Demian K. Jackson

(57) ABSTRACT

A cooling fan structure with rotational cylindrical fan vanes includes a rotary body and multiple rotational cylindrical bodies. The rotary body includes a rotor assembly and a stator assembly corresponding to the rotor assembly for driving the rotor assembly to rotate. The rotor assembly includes a hub. The hub has a top section and a circumferential section. The rotational cylindrical bodies are rotatably disposed on the top section or the circumferential section of the hub. When the rotary body rotates, the rotational cylindrical bodies are driven by the rotary body to self-rotate.

12 Claims, 14 Drawing Sheets

(56) References Cited

U.S. PATENT DOCUMENTS

| | | | | |
|---|---|---|---|---|
| 2006/0284503 | A1* | 12/2006 | Lin | H02K 5/163 |
| | | | | 310/90 |
| 2010/0329901 | A1* | 12/2010 | Horng | F04D 29/056 |
| | | | | 417/354 |
| 2011/0056659 | A1* | 3/2011 | Horng | H01L 23/467 |
| | | | | 165/104.26 |
| 2013/0286581 | A1* | 10/2013 | MacDonald | F04D 29/666 |
| | | | | 361/679.48 |

* cited by examiner

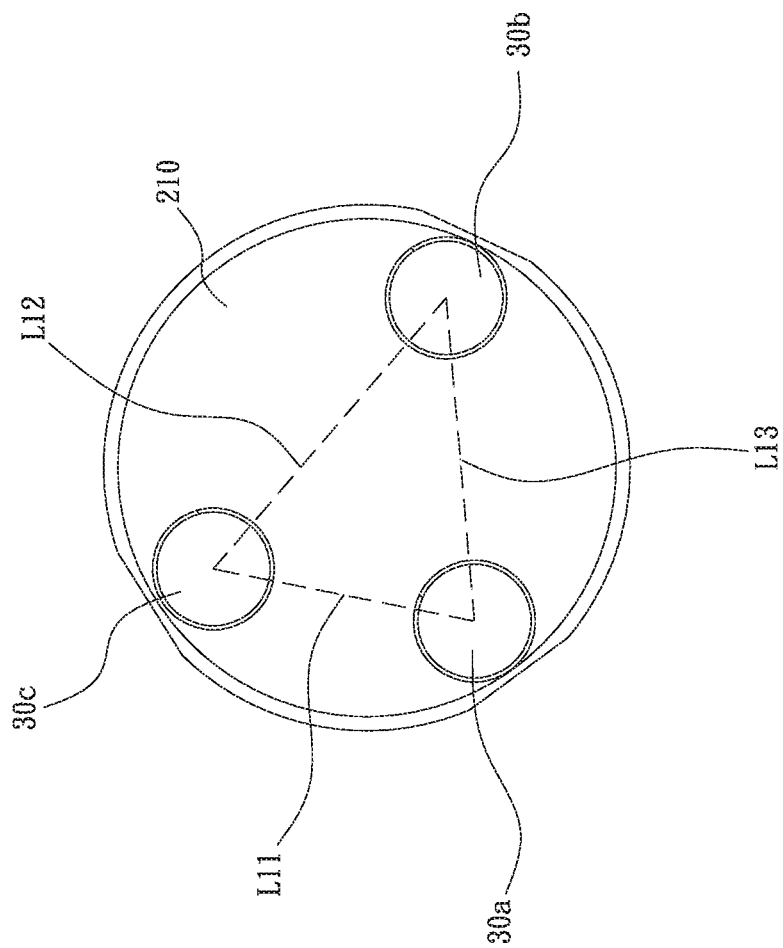

COOLING FAN STRUCTURE WITH ROTATIONAL CYLINDRICAL FAN BLADES

BACKGROUND OF THE INVENTION

1. Field of the Invention

The present invention relates generally to a fan, and more particularly to a cooling fan structure with rotational cylindrical fan vanes.

2. Description of the Related Art

The fan vanes of a conventional fan can rotate to create airflow by a designed angle. The airflow flows through the upper and lower surfaces of the wing-shaped fan vane. The lengths of the upper and lower surfaces are unequal to each other so that the speed of the airflow is varied. This is because the flowing speed of the airflow on the upper surface of the fan vane is faster so that the ambient air pressure is smaller. In contrast, the flowing speed of the airflow on the lower surface of the fan vane is slower so that the ambient air pressure is greater. Due to the pressure difference, the pressure of the lower surface will provide a lifting force to push the fan vane upward. The reaction force of the lifting force forms an airflow push force. When the airflow flows through the surfaces of the wing-shaped fan vane, the airflow will turn to do work so that the fan can provide its function.

However, the conventional fan has dynamic and static vane structures or single moving vanes in cooperation with outer frame with rib structures. Due to the inter-affection between the wing-shaped structures of the vanes, the wideband noise and narrowband noise are generally louder. Furthermore, in the conventional fan structure, due to the affection of the wing-shaped vanes, the airflow will radially flow out. In this case, the fan can hardly sufficiently dissipate the heat of the heat generation component in the system right behind the fan.

It is therefore tried by the applicant to provide a cooling fan structure with rotational cylindrical fan vanes to solve the above problems existing in the conventional fan.

SUMMARY OF THE INVENTION

It is therefore a primary object of the present invention to provide a cooling fan structure with rotational cylindrical fan vanes. The cooling fan includes a rotary body and multiple rotational cylindrical bodies rotatably disposed on the rotary body. When the rotary body rotates, all the rotational cylindrical bodies are driven by the rotary body to self-rotate.

It is a further object of the present invention to provide the above cooling fan structure with rotational cylindrical fan vanes. The multiple rotational cylindrical bodies are rotatably disposed on the top section of the hub as fan vanes. When the hub is rotated, the rotational cylindrical bodies are driven by the hub to revolve around the central line of the hub. In addition, the rotational cylindrical bodies will self-rotate to create radial airflow flowing in the radial direction of the hub.

It is still a further object of the present invention to provide the above cooling fan structure with rotational cylindrical fan vanes. The multiple rotational cylindrical bodies are rotatably disposed on the circumferential section of the hub as fan vanes. When the hub is rotated, the rotational cylindrical bodies are driven by the hub to revolve around the central line of the hub. In addition, the rotational cylindrical bodies will self-rotate to create axial airflow flowing in the axial direction of the hub.

It is still a further object of the present invention to provide the above cooling fan structure with rotational cylindrical fan vanes, in which the airflow guided out by the rotational cylindrical bodies is free from the interaction between the conventional wing-shaped fan vanes. Therefore, in the condition of same heat dissipation effect, the noise made by the present invention is less.

It is still a further object of the present invention to provide the above cooling fan structure with rotational cylindrical fan vanes, in which the airflow guided out by the rotational cylindrical bodies is relatively converged and the range of the airflow is wider. Therefore, the heat generated by the heat generation component or heat source in the system can be directly carried away by the circulating airflow.

It is still a further object of the present invention to provide the above cooling fan structure with rotational cylindrical fan vanes, in which Magnus effect is applied to the cooling fan to create corresponding airflow.

It is still a further object of the present invention to provide the above cooling fan structure with rotational cylindrical fan vanes, in which the radiuses of the rotational cylindrical bodies are unequal to each other. Accordingly, the respective rotational cylindrical bodies produce different push forces, whereby the resultant push force of the rotational cylindrical bodies is biased to one side and the wind direction is also biased to one side. This can be applied to such a situation that the heat source is not positioned right behind the cooling fan to dissipate the heat.

To achieve the above and other objects, the cooling fan structure with rotational cylindrical fan vanes of the present invention includes a rotary body and multiple rotational cylindrical bodies. The rotary body includes a rotor assembly and a stator assembly corresponding to the rotor assembly for driving the rotor assembly to rotate. The rotor assembly includes a hub. The hub has a top section and a circumferential section. The rotational cylindrical bodies are rotatably disposed on the top section or the circumferential section of the hub. When the rotary body rotates, the rotational cylindrical bodies are driven by the rotary body to self-rotate.

In the above cooling fan structure with rotational cylindrical fan vanes, the hub includes multiple link members. The link members are disposed on the top section or the circumferential section of the hub. One end of each of the rotational cylindrical bodies is rotatably connected with the link member.

In the above cooling fan structure with rotational cylindrical fan vanes, the rotor assembly includes a first internal space and a second internal space. The second internal space is annularly positioned around the first internal space. A hub shaft is disposed in the first internal space and connected with the hub. A case section and a magnetic member are received in the first internal space. The magnetic member is disposed on an inner circumference of the case section.

In the above cooling fan structure with rotational cylindrical fan vanes, an annular diaphragm is positioned between the first and second internal spaces.

In the above cooling fan structure with rotational cylindrical fan vanes, the stator assembly includes a base seat having a central bearing cup. At least one bearing is disposed in the central bearing cup for supporting the hub shaft. A stator winding assembly is fitted around the central bearing cup corresponding to the magnetic member.

In the above cooling fan structure with rotational cylindrical fan vanes, multiple perforations are formed through the top section or the circumferential section of the hub. The link members are received in the perforations of the top section or the circumferential section of the hub.

In the above cooling fan structure with rotational cylindrical fan vanes, the rotational cylindrical body has a shaft rod. One end of the shaft rod of the rotational cylindrical body is tightly inserted through a hole of the link member to protrude from the hole and extend into the second internal space. The other end of the shaft rod is fixedly disposed in the rotational cylindrical body.

In the above cooling fan structure with rotational cylindrical fan vanes, the link member is a bearing.

In the above cooling fan structure with rotational cylindrical fan vanes, the rotational cylindrical bodies are asymmetrically arranged.

In the above cooling fan structure with rotational cylindrical fan vanes, an outer circumferential surface of each rotational cylindrical body is formed with at least one rib. The rib is a spiral rib, a wing-shaped rib or a waterwheel-shaped rib or the rib is divided into multiple segments circumferentially formed on the outer circumferential surface of the rotational cylindrical body.

In the above cooling fan structure with rotational cylindrical fan vanes, the radiuses of the rotational cylindrical bodies are equal or unequal to each other.

In the above cooling fan structure with rotational cylindrical fan vanes, the rotational speeds of the rotational cylindrical bodies are equal or unequal to each other.

In the above cooling fan structure with rotational cylindrical fan vanes, the shaft rod is formed with a groove. The groove is formed on the outer circumference of one end of the shaft rod in adjacency to an inner side of the top section of the hub. A retainer member is correspondingly connected in the groove.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 7 is a view of still another embodiment of the present invention, in which the rotational cylindrical bodies are asymmetrically arranged on the top section of the hub.

DETAILED DESCRIPTION OF THE PREFERRED EMBODIMENTS

Figure 1A:
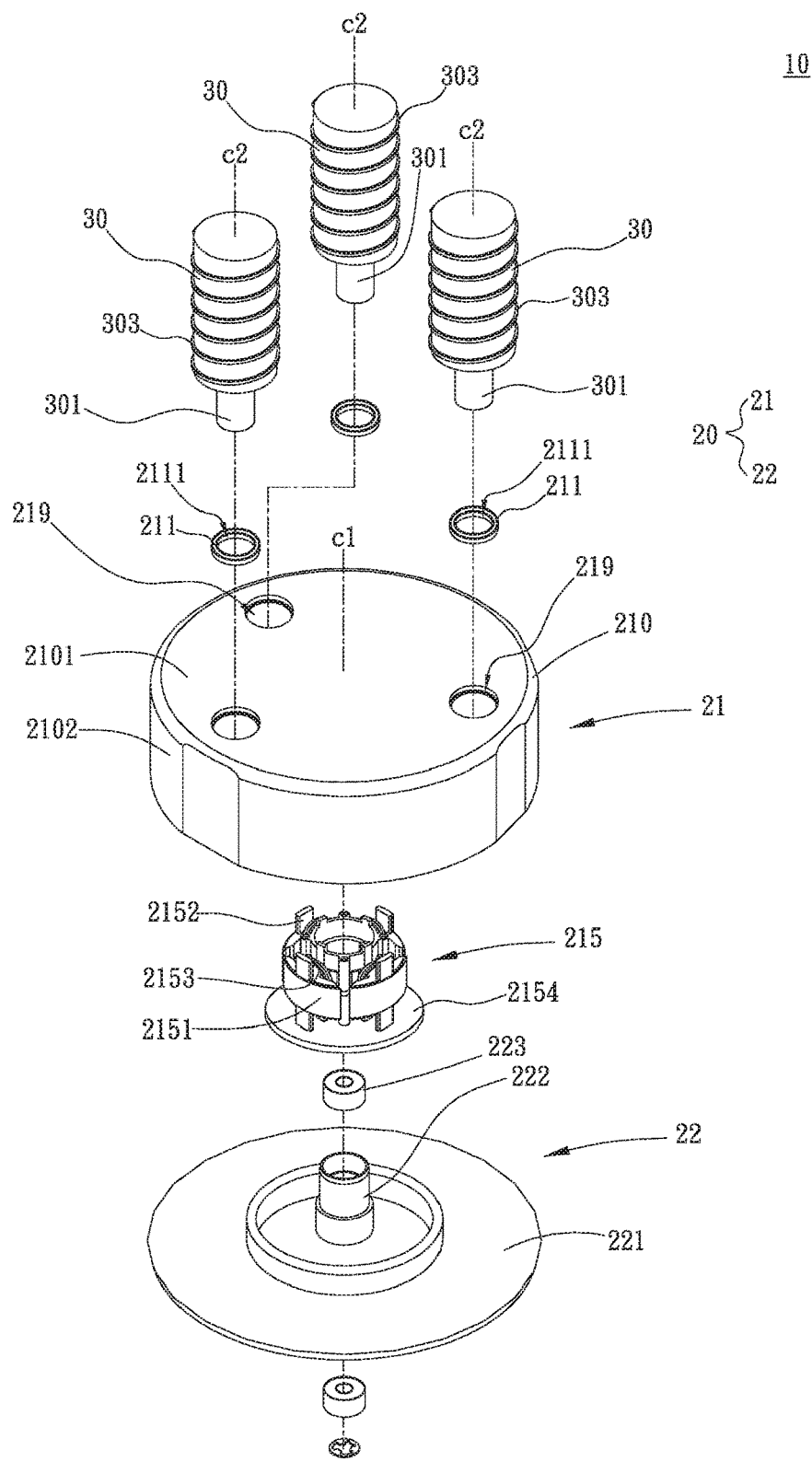
FIG. 1A is a perspective exploded view of the present invention.
Figure 1B:
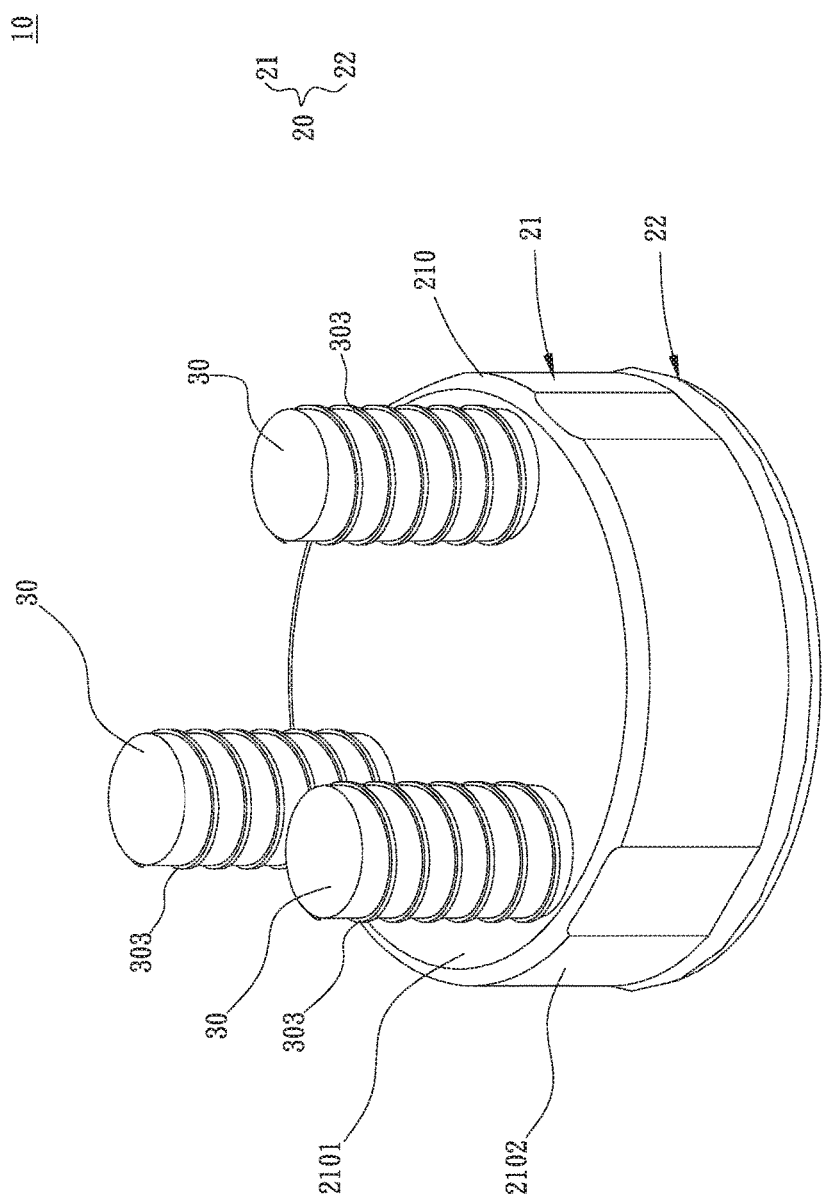
FIG. 1B is a perspective assembled view of the present invention.
Figure 1C:
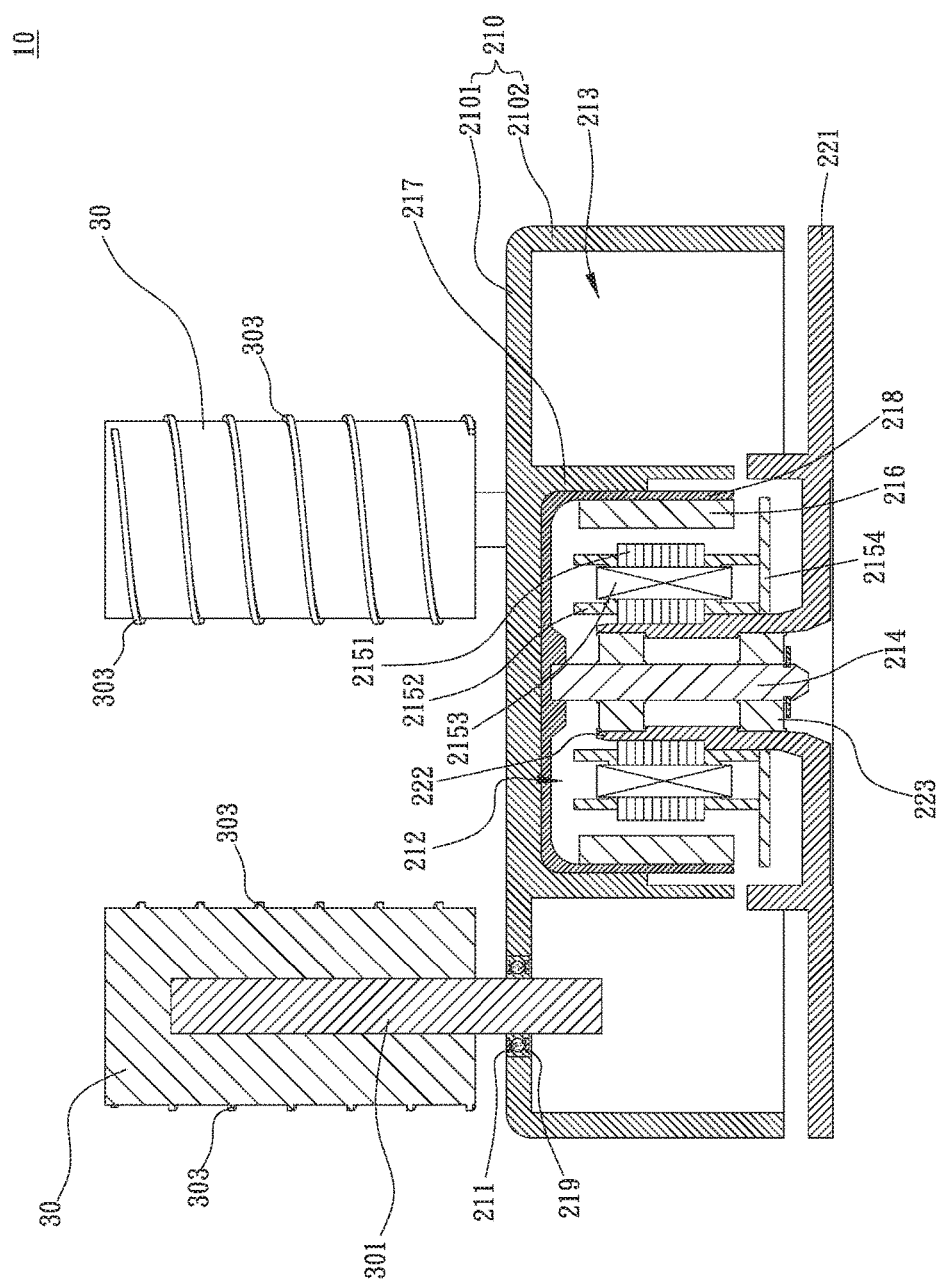
FIG. 1C is a sectional assembled view of the present invention.

Please refer to FIGS. 1A, 1B and 1C. FIG. 1A is a perspective exploded view of the present invention. FIG. 1B is a perspective assembled view of the present invention. FIG. 1C is a sectional assembled view of the present invention. The cooling fan 10 includes a rotary body 20 and multiple rotational cylindrical bodies 30. The rotary body 20 includes a rotor assembly 21 and a stator assembly 22. The rotor assembly 21 includes a hub 210, multiple link members 211, a first internal space 212 and a second internal space 213. The hub 210 has a top section 2101, a circumferential section 2102 extending from outer circumference of the top section 2101 and multiple perforations 219. The circumferential section 2102 is normal to the top section 2101. The perforations 219 are formed through the hub 210. In this embodiment, the perforations 219 are formed through the top section 2101 of the hub 210 in communication with the second internal space 213. The link members 211 are received in the perforations 219.

In this embodiment, the link members 211 are, but not limited to, bearings 223. The link members 211 are disposed in the hub 210. In this embodiment, the link members 211 are received in the perforations 219 of the top section 2101 of the hub 210. The top faces of the link members 211 are flush with the top face of the hub 210, (that is, the outer surface of the top section 2101 of the hub 210). Each link member 211 is formed with a hole 2111.

The first and second internal spaces 212, 213 are concentrically arranged. The second internal space 213 is annularly positioned around the first internal space 212. An annular diaphragm 217 is positioned between the first and second internal spaces 212, 213 to partition the hub 210 into two internal spaces (the first and second internal spaces 212, 213). A hub shaft 214 is disposed in the first internal space 212 and connected with the hub 210. In addition, a case section 218 (such as an iron case) and a magnetic member 216 (such as a magnet) are disposed in the first internal space 212. The magnetic member 216 is annularly disposed on inner circumference of the case section 218.

The stator assembly 22 includes a base seat 221 having a central bearing cup 222. At least one bearing 223 is disposed in the central bearing cup 222 for supporting the hub shaft 214. The hub shaft 214 is inserted (or rotatably disposed) in the bearing 223 in the central bearing cup 222 and retained by a retainer plate (such as a C-shaped retainer). Accordingly, the rotor assembly 21 is disposed on the stator assembly 22. A stator winding assembly 215 is fitted around the central bearing cup 222 corresponding to the magnetic member 216 in the first internal space 212. After powered on, the stator winding assembly 215 is magnetized to interact with the magnetic member 216 so as to drive the rotor assembly 21 of the rotary body 20 to rotate. The stator winding assembly 215 includes a stacked silicon steel sheet assembly 2151, an insulation support assembly 2152, a circuit board 2154 and a winding assembly 2153. The insulation support assembly 2152 is respectively disposed on the upper and lower sides of the silicon steel sheet assembly 2151. The winding assembly 2153 is wound on the insulation support assembly 2152. The circuit board 2154 is disposed under the insulation support assembly 2152 and electrically connected with the winding assembly 2153. The circuit board 2154 is connected to an external power supply (not shown) via a wire (not shown) to provide power for the operation of the stator winding assembly 215. The hub 210 and the base seat 221 are made of insulation material such as plastic material.

In this embodiment, the multiple rotational cylindrical bodies 30 are arranged on the top section 2101 of the hub 210 and normal to the top section 2101. One end of the rotational cylindrical body 30 is rotatably connected with the link member 211, whereby the rotational cylindrical body 30 can self-rotate within the link member 211. By means of the link member 211, the rotational efficiency of the rotational cylindrical body 30 can be effectively enhanced. In addition, a central line c2 of the rotational cylindrical body 30 is parallel to a central line c1 of the hub 210. The rotational cylindrical bodies 30 are driven by the rotor assembly 21 of the rotary body 20 to revolve around the central line c1 of the hub 210. In a preferred embodiment, the link member 211 is omissible. Alternatively, one end of the rotational cylindrical body 30 is loosely inserted in the perforation 219 of the hub 210. Accordingly, when the rotor assembly 21 of the rotary body 20 is rotated, the rotational cylindrical bodies 30 are driven to self-rotate.

Figure 2A:
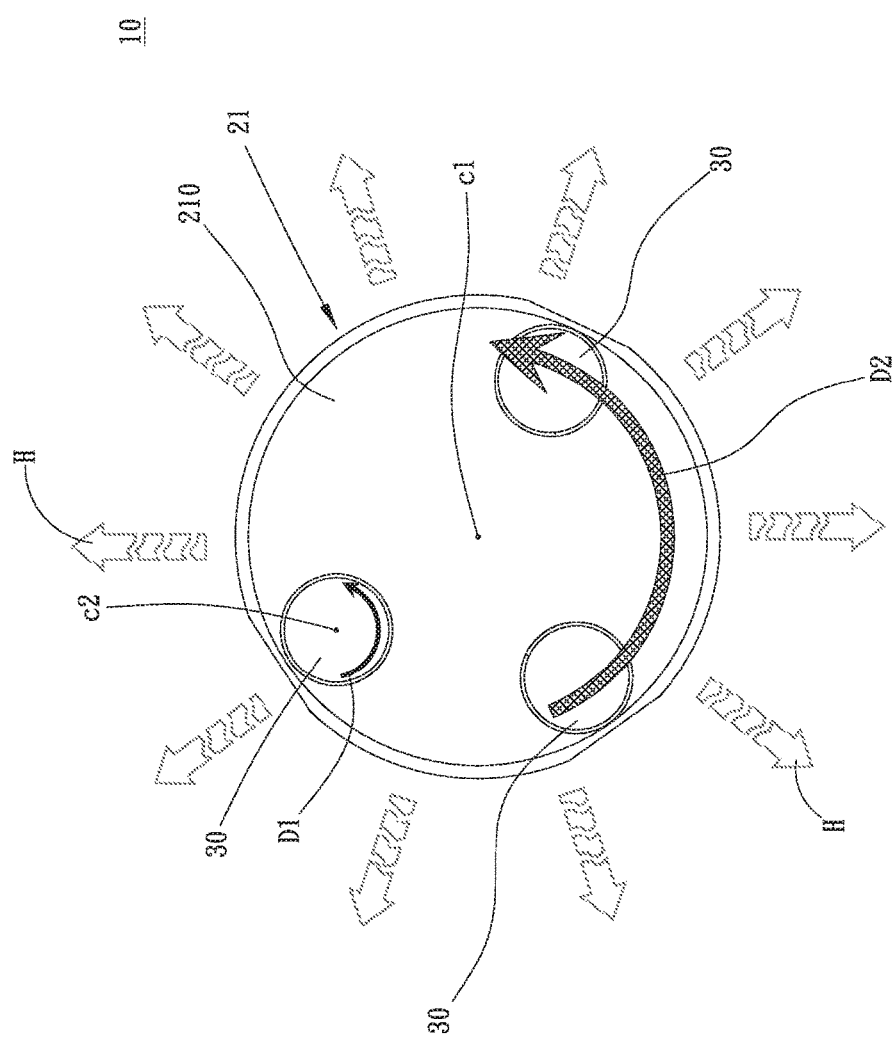
FIG. 2A is a top view of the present invention, showing the operation thereof.

Please now refer to FIGS. 1A, 1C and 2A. The rotational cylindrical body 30 has a shaft rod 301. One end of the shaft rod 301 of the rotational cylindrical body 30 is tightly inserted through the hole 2111 of the link member 211 to protrude from the hole 2111 and extend into the second internal space 213. The other end of the shaft rod 301 is fixedly disposed in the rotational cylindrical body 30. The link member 211 serves to support the shaft rod 301 of the rotational cylindrical body 30, whereby the rotational cylindrical body 30 is positioned on the top section 2101 of the hub 210. When the rotor assembly 21 of the rotary body 20 is rotated, the rotational cylindrical bodies 30 are driven to self-rotate within the link members 211. The rotational direction D1 of the rotational cylindrical body 30 is the same as the rotational direction D2 of the rotor assembly 21. In addition, the outer circumferential surface of each rotational cylindrical body 30 is formed with at least one rib 303. In this embodiment, the rib 303 is a spiral rib, which is spirally disposed on the outer circumferential surface of each rotational cylindrical body 30.

Figure 2B:
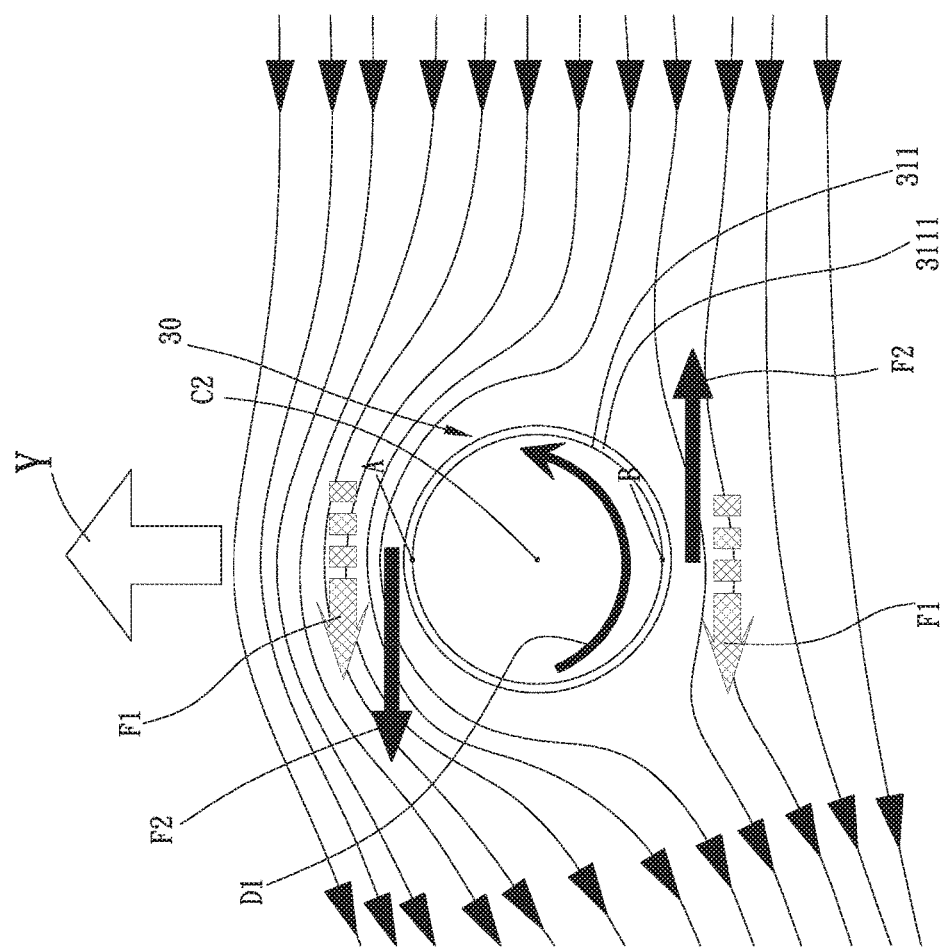
FIG. 2B is a view showing the rotation of the rotational cylindrical fan vane of the present invention.

Please further refer to FIGS. 2A and 2B. When the hub 210 of the rotor assembly 21 rotates to drive the rotational cylindrical bodies 30 to revolve around the central line c1 of the hub 210, the rotational inertia of the hub 210 of the rotor assembly 21 will forcedly drive the asymmetrically arranged rotational cylindrical bodies 30 to rotate due to gravity (or shake, vibrate or deflect) in the rotational direction D2 of the hub 210. Accordingly, the shaft rods 301 of the rotational cylindrical bodies 30 will drive the respective link members 211 to rotate together. When the hub 210 continuously rotates, under the inertial continuous acceleration, the rotational cylindrical bodies 30 will rotate within the link members 211 and revolve around the central line c1 of the hub 210. At this time, a transverse airflow will flow toward one side of the rotational cylindrical body 30 (from right side to left side of FIG. 2B). According to Magnus effect, an additive effect is applied to the speed sum on the upper side A of the rotational cylindrical body 30, (that is, the transverse speed F1 and the tangential speed F2 are in the same direction). As a result, the speed is increased and the pressure is smaller (according to Bernoulli's principle). In contrast, a subtractive effect is applied to the speed sum on the lower side B of the rotational cylindrical body 30, (that is, the transverse speed F1 and the tangential speed F2 are in the reverse directions). As a result, the speed is decreased and the pressure is greater (according to Bernoulli's principle). Eventually, under the pressure difference, the side with greater pressure will push the side with smaller pressure to produce transverse push force Y normal to the direction of the transverse airflow. Under such effect, the cooling fan 10 can produce radial airflow H (as centrifugal airflow). That is, the airflow H will radially flow in the radial direction of the cooling fan 10.

Figure 3:
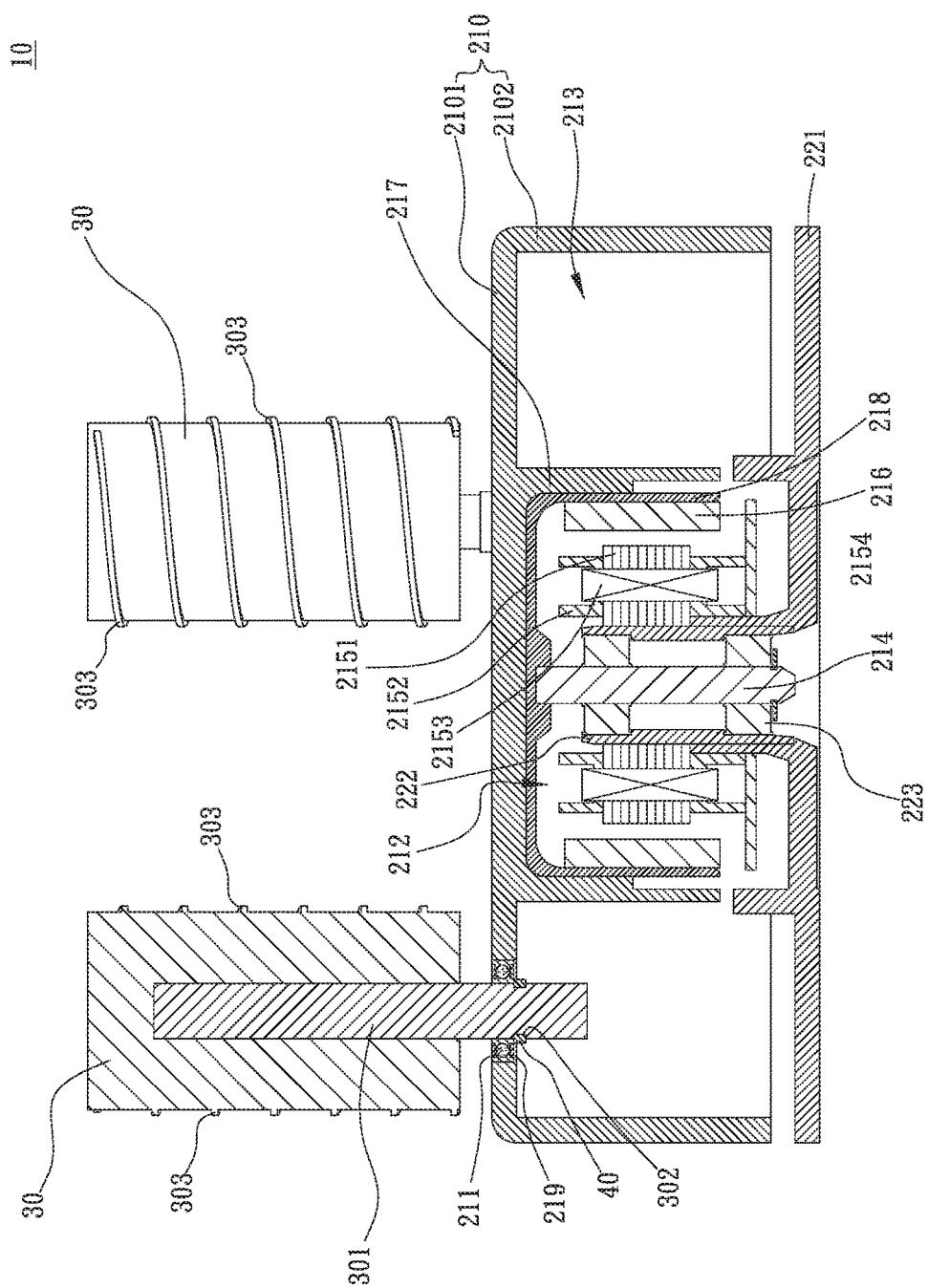
FIG. 3 is a sectional assembled view of another embodiment of the present invention.

Please now refer to FIG. 3. In another embodiment, the shaft rod 301 is formed with a groove 302. The groove 302 is formed on the outer circumference of one end of the shaft rod 301 in adjacency to the inner side of the top section 2101 of the hub 210. A retainer member 40 (such as a C-shaped retainer) is positioned in the groove 302 to effectively prevent the shaft rod 301 from detachment.

Figure 4A:
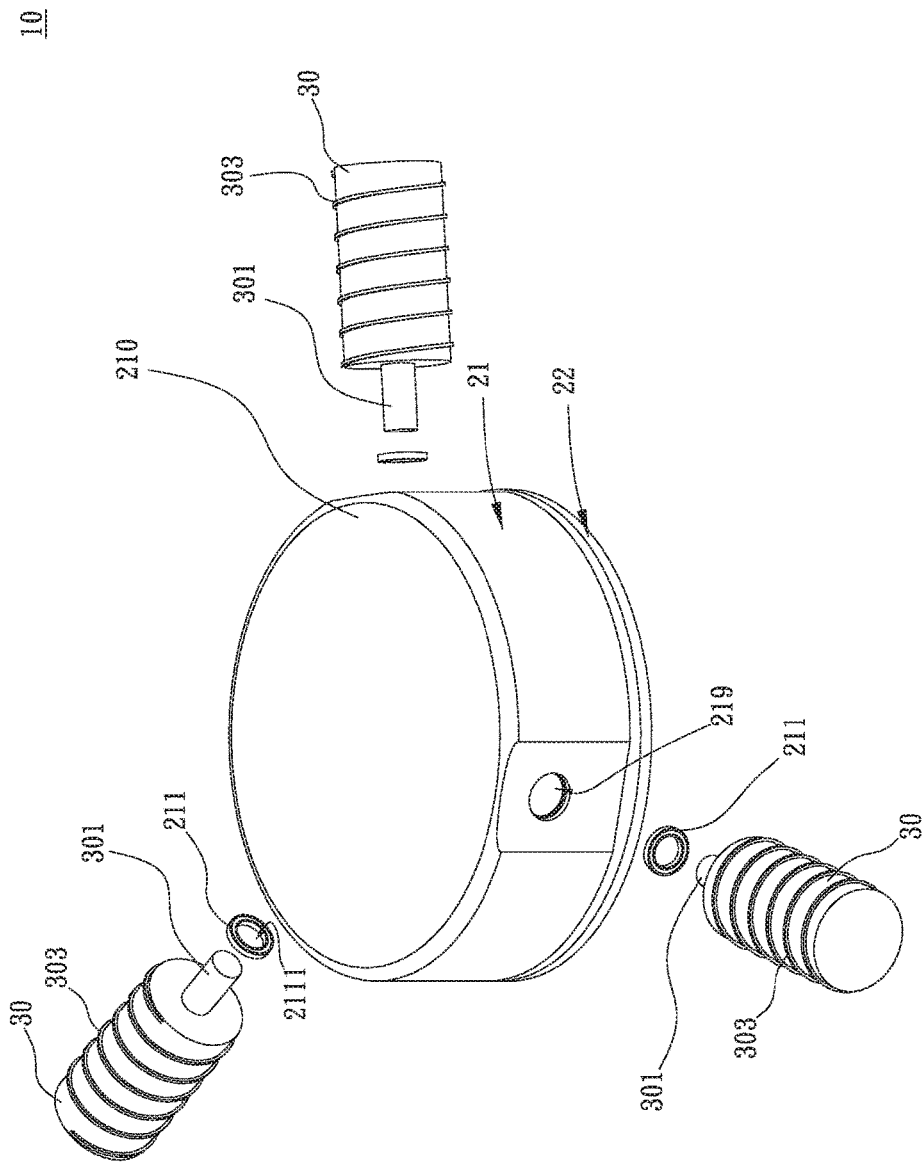
FIG. 4A is a perspective exploded view of another embodiment of the present invention.
Figure 4B:
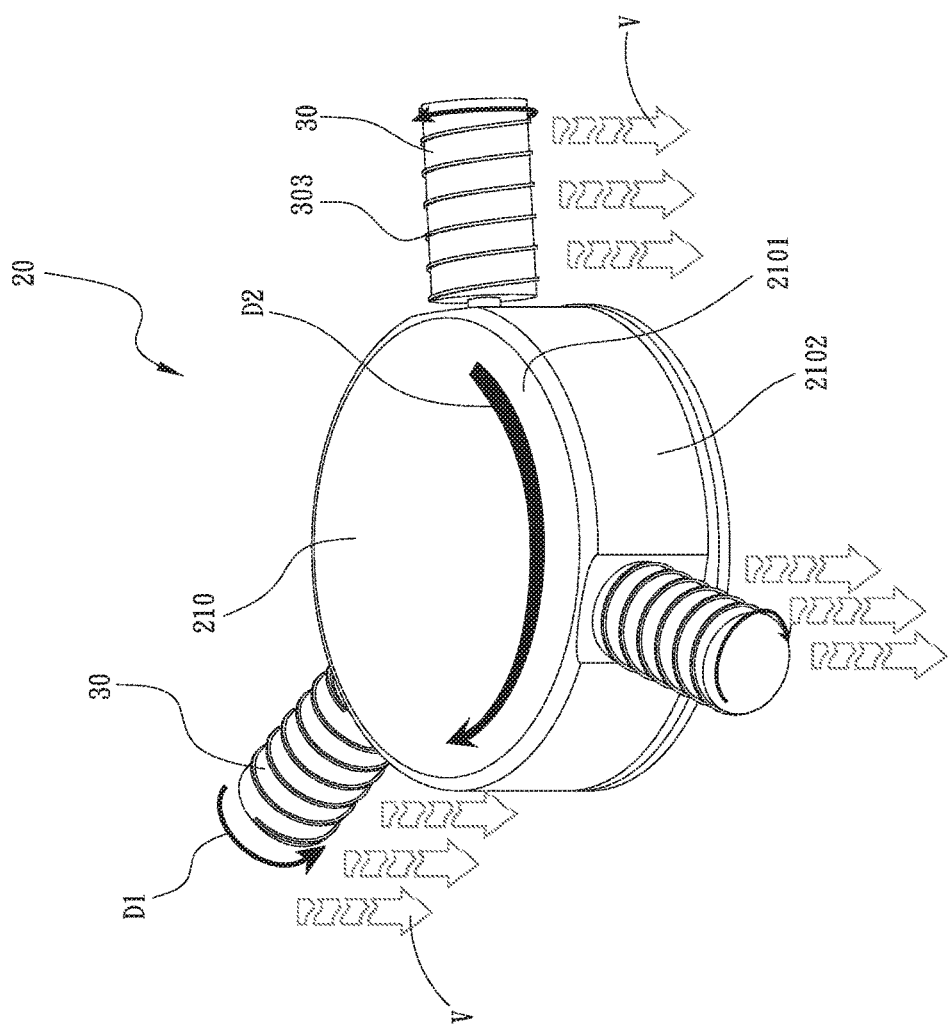
FIG. 4B is a perspective assembled view of the other embodiment of the present invention, showing the operation thereof.
Figure 4C:
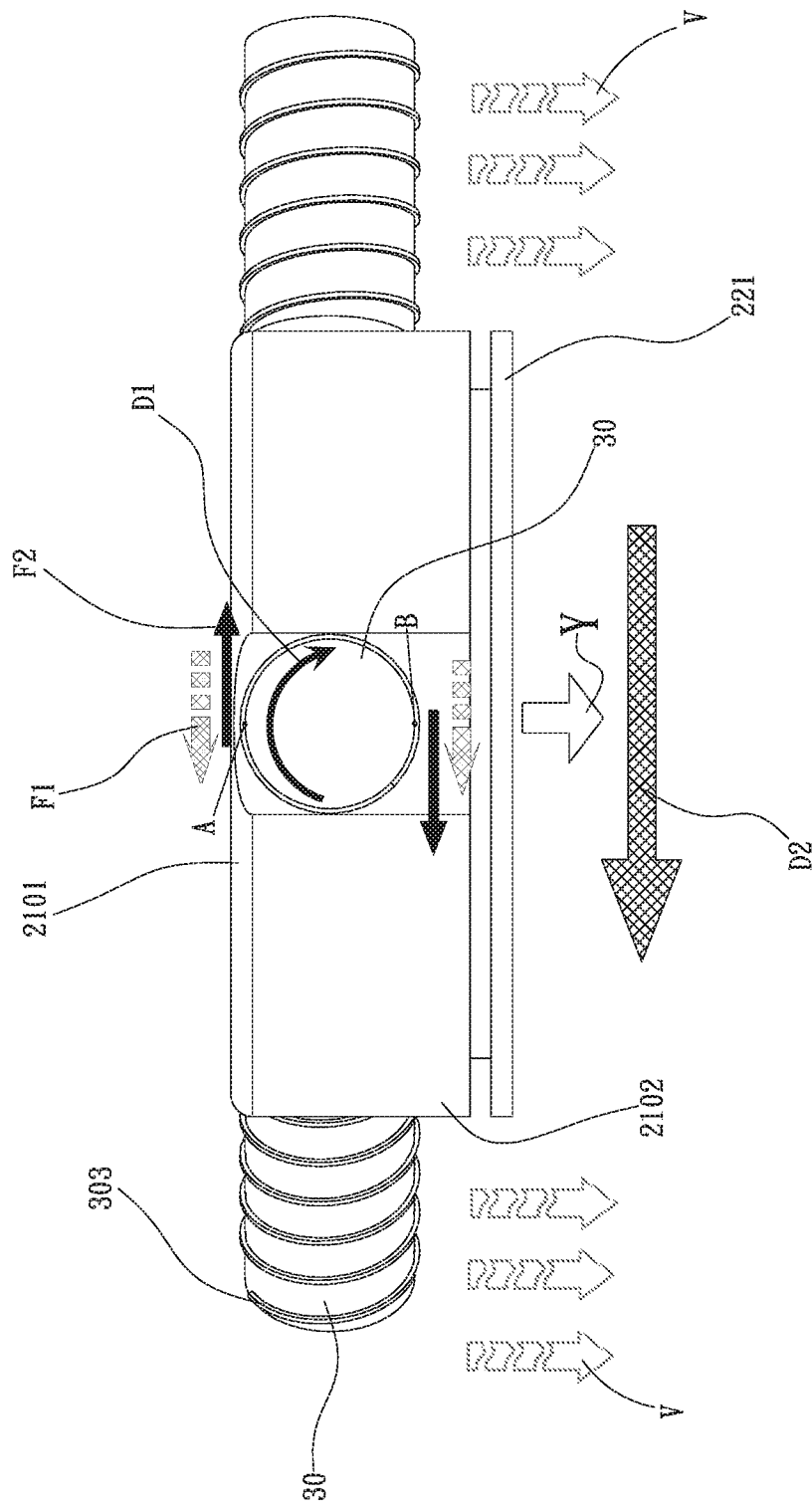
FIG. 4C is a front view of the other embodiment of the present invention, showing the operation thereof.

Please further refer to FIGS. 4A, 4B and 4C. In still another embodiment, the rotational cylindrical bodies 30 are radially asymmetrically rotatably arranged on the circumferential section 2102 of the hub 210 of the rotary body 20. Also, the perforations 219 are alternatively formed through the circumferential section 2102 of the hub 210. The link members 211 are received in the perforations 219 of the circumferential section 2102 and the rotational cylindrical bodies 30 are rotatably disposed in the link members 211. When the hub 210 of the rotary body 20 rotates, due to the rotational inertia of the hub 210 of the rotary body 20, the rotational cylindrical bodies 30 will also rotate. At this time, a subtractive effect is applied to the speed sum on the upper side A of the rotational cylindrical body 30, (that is, the transverse speed F1 and the tangential speed F2 are in the reverse directions). As a result, the speed is decreased and the pressure is greater (according to Bernoulli's principle). In contrast, an additive effect is applied to the speed sum on the lower side B of the rotational cylindrical body 30, (that is, the transverse speed F1 and the tangential speed F2 are in the same direction). As a result, the speed is increased and the pressure is smaller (according to Bernoulli's principle). Eventually, under the pressure difference, the side with greater pressure will push the side with smaller pressure to produce transverse push force Y normal to the direction of the transverse airflow. Accordingly, the cooling fan 10 can produce axial airflow V, which flows in the axial direction of the cooling fan 10. The rotational direction D1 of the rotational cylindrical body 30 is the same as the rotational direction D2 of the rotor assembly 21.

Figure 5A:
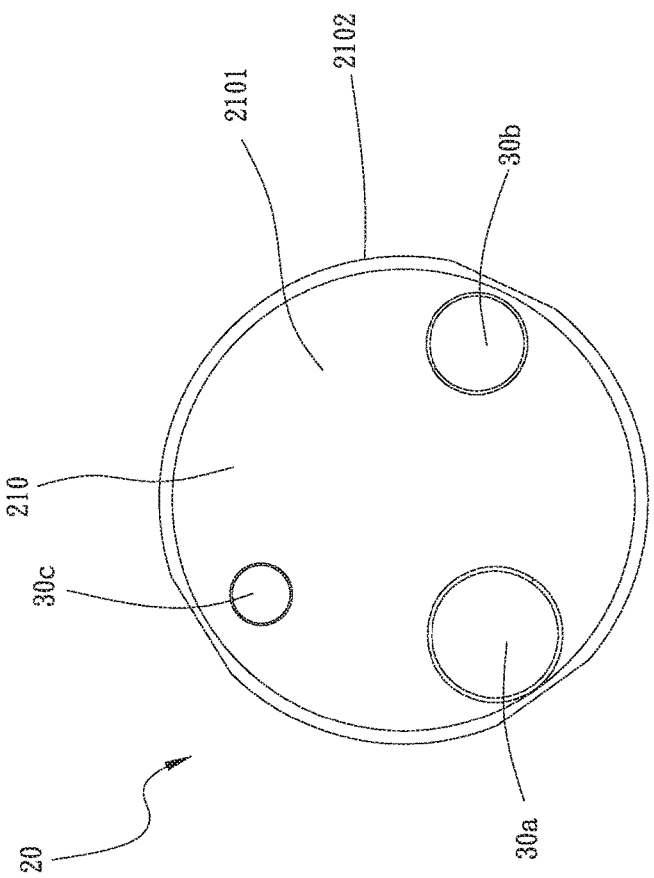
FIG. 5A is a view of still another embodiment of the present invention.
Figure 5B:
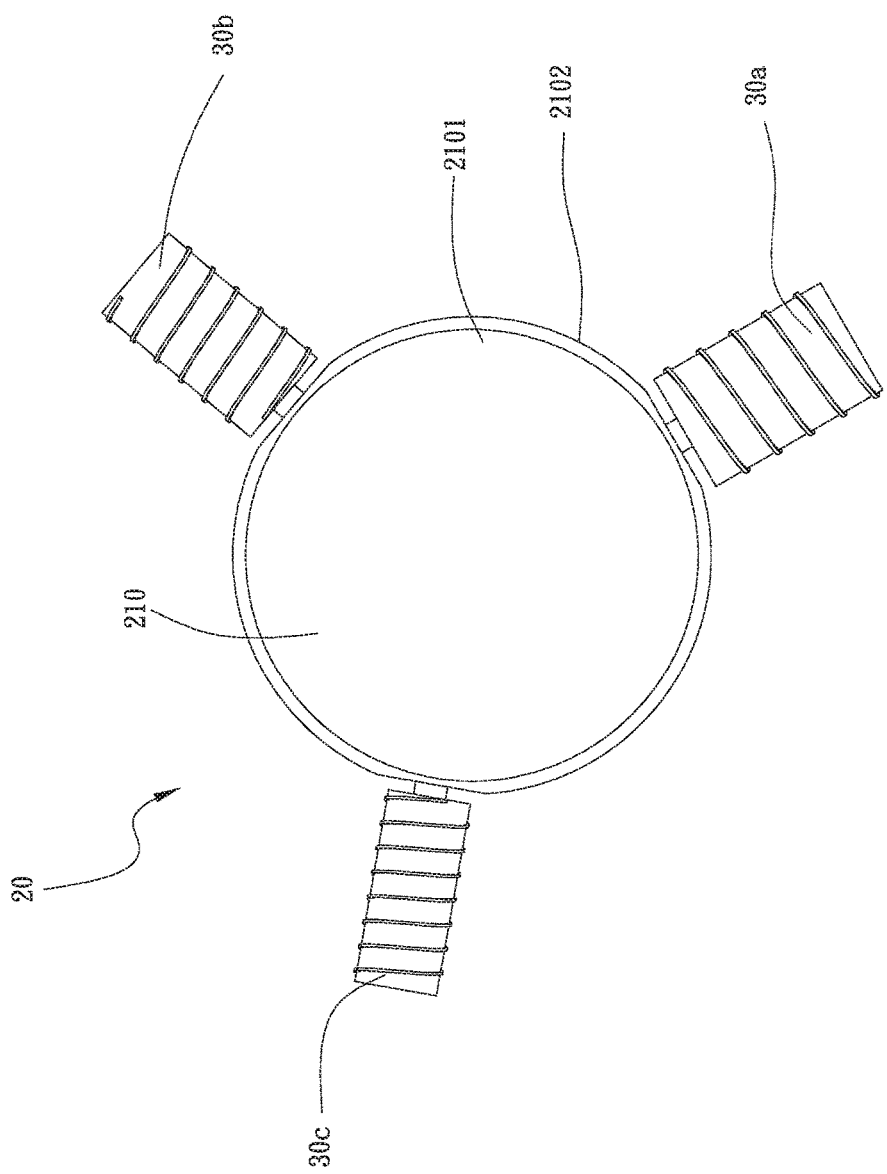
FIG. 5B is a view of still another embodiment of the present invention.

Please now refer to FIGS. 5A and 5B. In the aforesaid embodiments, the radiuses of the rotational cylindrical bodies 30 are equal to each other. However, in some modified embodiments, the radiuses of the rotational cylindrical bodies 30 disposed on the top section 2101 (as shown in FIG. 5A) of the hub 210 of the rotary body 20 or the circumferential section 2102 (as shown in FIG. 5B) of the hub 210 of the rotary body 20 are unequal to each other. For example, as shown in the drawings, there are three rotational cylindrical bodies 30a, 30b, 30c. The radius of the rotational cylindrical body 30a is larger than the radius of the rotational cylindrical body 30b, while the radius of the rotational cylindrical body 30b is larger than the radius of the rotational cylindrical body 30c. Accordingly, the respective rotational cylindrical bodies 30a, 30b, 30c produce different output air volumes to create different push forces. Therefore, the amount of the output air volume can be adjusted to bias the resultant push force of the rotational cylindrical bodies to one side. This can be applied to such a situation that the heat source is not positioned right behind the cooling fan 10 to dissipate the heat.

Figure 6C:
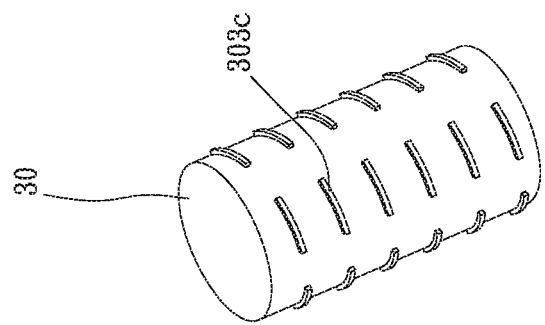
FIG. 6C is a perspective view of still another embodiment of the rotational cylindrical body of the present invention.
Figure 6B:
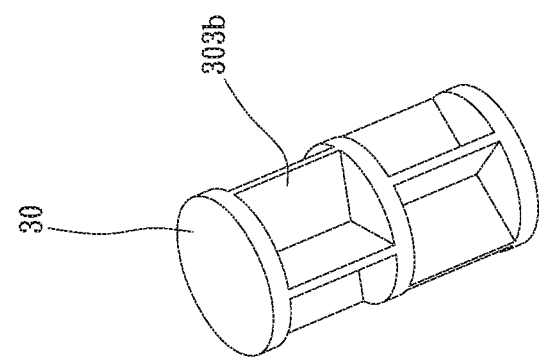
FIG. 6B is a perspective view of still another embodiment of the rotational cylindrical body of the present invention.
Figure 6A:
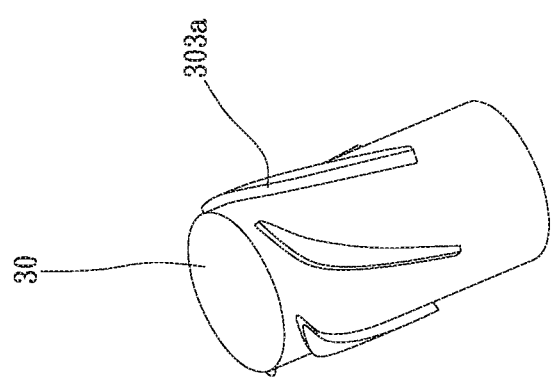
FIG. 6A is a perspective view of another embodiment of the rotational cylindrical body of the present invention.

Please further refer to FIGS. 6A, 6B and 6C. In the aforesaid embodiments, the ribs 303 formed on the outer circumferential surface of the rotational cylindrical body 30 are spiral ribs (as shown in the drawings). Alternatively, in some modified embodiments, the ribs 303a can be wing-shaped (as shown in FIG. 6A) or the ribs 303b are waterwheel-shaped (as shown in FIG. 6B) or the ribs 303c are divided into multiple segments circumferentially formed on the outer circumferential surface of the rotational cylindrical body 30.

Please now refer to FIG. 7. In this embodiment, the rotational cylindrical bodies 30a, 30b, 30c are asymmetrically arranged on the top section 2101 of the hub 210. That is, the straight distances between the rotational cylindrical bodies 30a, 30b, 30c are unequal to each other. As shown in FIG. 7, the straight distances L11~L13 are unequal to each other.

Figure 8:
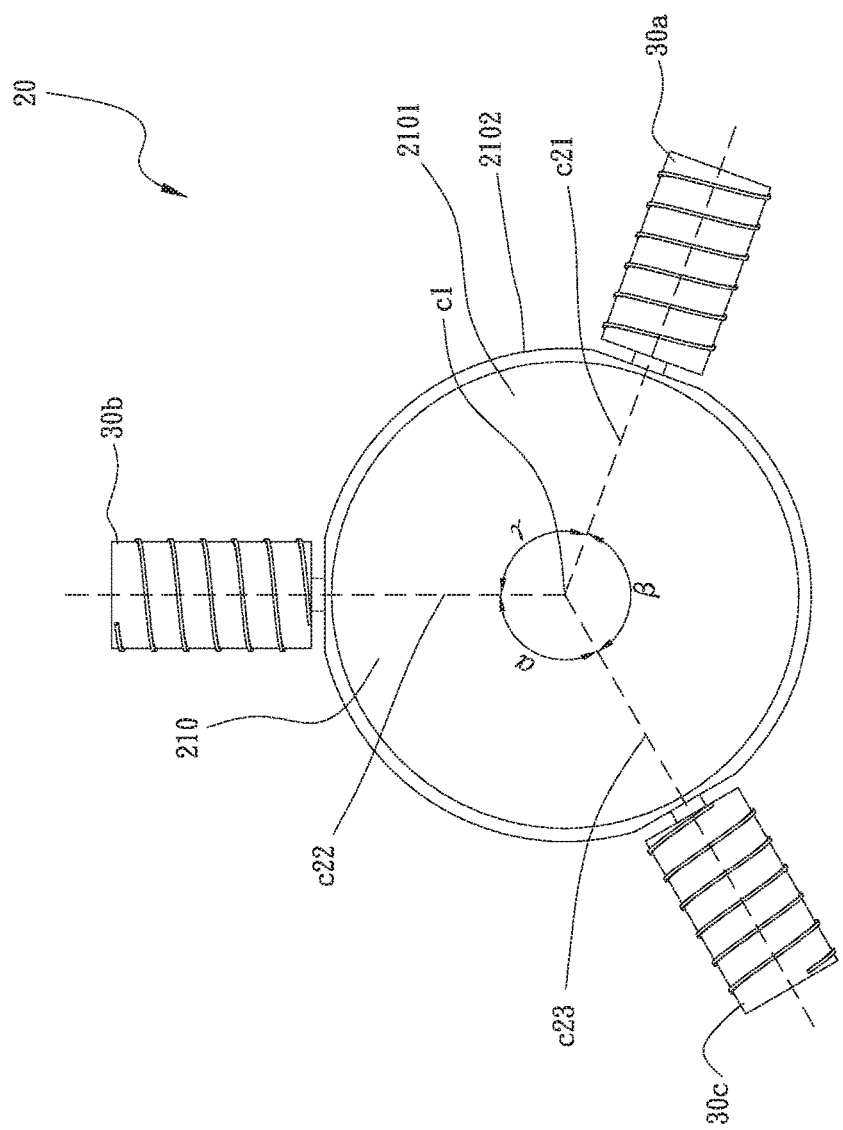
FIG. 8 is a view of still another embodiment of the present invention, in which the rotational cylindrical bodies are asymmetrically arranged on the circumferential section of the hub.

Please further refer to FIG. 8. The rotational cylindrical bodies 30a, 30b, 30c are radially asymmetrically arranged on the circumferential section 2102 of the hub 210 of the rotary body 20. That is, the angles α, β, γ contained between the rotational cylindrical bodies 30a, 30b, 30c are unequal to each other. For example, the angle α is 120 degrees, the angle β is 140 degrees, while the angle γ is 100 degrees. Moreover, as shown in FIG. 8, the axes c21, c22, c23 of the rotational cylindrical bodies 30a, 30b, 30c extend to the central line c1 of the hub 210. The angle γ contained between the rotational cylindrical bodies 30a and 30b is defined between the axes c21 and c22. The angle α contained between the rotational cylindrical bodies 30b and 30c is defined between the axes c22 and c23. The angle β contained between the rotational cylindrical bodies 30c and 30a is defined between the axes c21 and c23.

In conclusion, the present invention has the following advantages:
1. When the rotary body 20 of the cooling fan 10 rotates, all the rotational cylindrical bodies 30 arranged on the top section 2101 (or the circumferential section 2102) of the rotary body 20 are driven to revolve around the central line c1 of the hub 210 and self-rotate.
2. In the case that the rotational cylindrical bodies 30 are arranged on the top section 2101 of the hub 210, a radial airflow is created. Alternatively, in the case that the rotational cylindrical bodies 30 are arranged on the circumferential section 2102 of the hub 210, an axial airflow is created.
3. The airflow guided out by the rotational cylindrical bodies 30 is free from the interaction between the conventional wing-shaped fan vanes. Therefore, in the condition of same heat dissipation effect, the noise made by the present invention is less.
4. The airflow guided out by the rotational cylindrical bodies 30 is relatively converged and the range of the airflow is wider. Therefore, the heat generated by the heat generation component or heat source in the system can be directly carried away by the circulating airflow.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A cooling fan structure with rotational cylindrical fan vanes, comprising:
   a rotary body including a rotor assembly and a stator assembly corresponding to the rotor assembly for driving the rotor assembly to rotate, the rotor assembly including a hub, the hub having a top section and a circumferential section; and
   multiple rotational cylindrical bodies rotatably disposed on the top section or the circumferential section of the hub, whereby when the rotary body rotates, the rotational cylindrical bodies are driven by the rotary body to self-rotate.

2. The cooling fan structure with rotational cylindrical fan vanes as claimed in claim 1, wherein the hub includes multiple link members, the link members being disposed on the top section or the circumferential section of the hub, one end of each of the rotational cylindrical bodies being rotatably connected with the link member.

3. The cooling fan structure with rotational cylindrical fan vanes as claimed in claim 2, wherein the rotor assembly includes a first internal space and a second internal space, the second internal space being annularly positioned around the first internal space, a hub shaft being disposed in the first internal space and connected with the hub, a case section and a magnetic member being received in the first internal space, the magnetic member being disposed on an inner circumference of the case section.

4. The cooling fan structure with rotational cylindrical fan vanes as claimed in claim 3, wherein an annular diaphragm is positioned between the first and second internal spaces.

5. The cooling fan structure with rotational cylindrical fan vanes as claimed in claim 3, wherein the stator assembly includes a base seat having a central bearing cup, at least one bearing being disposed in the central bearing cup for supporting the hub shaft, a stator winding assembly being fitted around the central bearing cup corresponding to the magnetic member.

6. The cooling fan structure with rotational cylindrical fan vanes as claimed in claim 2, wherein multiple perforations are formed through the top section or the circumferential section of the hub, the link members being received in the perforations of the top section or the circumferential section of the hub.

7. The cooling fan structure with rotational cylindrical fan vanes as claimed in claim 6, wherein the rotational cylindrical body has a shaft rod, one end of the shaft rod of the rotational cylindrical body being tightly inserted through a hole of the link member to protrude from the hole and extend into the second internal space, the other end of the shaft rod being fixedly disposed in the rotational cylindrical body.

8. The cooling fan structure with rotational cylindrical fan vanes as claimed in claim 2, wherein the link member is a bearing.

9. The cooling fan structure with rotational cylindrical fan vanes as claimed in claim 1, wherein the rotational cylindrical bodies are asymmetrically arranged.

10. The cooling fan structure with rotational cylindrical fan vanes as claimed in claim 1, wherein an outer circumferential surface of each rotational cylindrical body is formed with at least one rib, the rib being a spiral rib, a wing-shaped rib or a waterwheel-shaped rib or the rib being divided into multiple segments circumferentially formed on the outer circumferential surface of the rotational cylindrical body.

11. The cooling fan structure with rotational cylindrical fan vanes as claimed in claim 1, wherein the radiuses of the rotational cylindrical bodies are equal or unequal to each other.

12. The cooling fan structure with rotational cylindrical fan vanes as claimed in claim 7, wherein the shaft rod is formed with a groove, the groove being formed on the outer circumference of one end of the shaft rod in adjacency to an inner side of the top section of the hub, a retainer member being correspondingly connected in the groove.

* * * * *